United States Patent
Kanevsky et al.

(10) Patent No.: US 6,246,985 B1
(45) Date of Patent: Jun. 12, 2001

(54) METHOD AND APPARATUS FOR AUTOMATIC SEGREGATION AND ROUTING OF SIGNALS OF DIFFERENT ORIGINS BY USING PROTOTYPES

(75) Inventors: Dimitri Kanevsky, Ossining, NY (US); Stephane H. Maes, Danbury, CT (US); Wlodek Wlodzimierz Zadrozny, Tarrytown; Alexander Zlatsin, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,966

(22) Filed: Aug. 20, 1998

(51) Int. Cl.[7] .......................... H04M 3/527; G06F 13/00
(52) U.S. Cl. ................... 704/270; 704/256; 379/93.11; 455/31.2; 370/351
(58) Field of Search ................................ 704/256, 270; 379/93.11, 211; 455/31.2; 370/351

(56) References Cited

U.S. PATENT DOCUMENTS 5,056,132 * 10/1991 Coleman et al. .................. 379/93.11
5,159,624 * 10/1992 Makita ................................ 455/31.2
5,239,700 * 8/1993 Guenther et al. ................. 455/158.4
5,768,350 * 6/1998 Venkatakrishnan ............... 379/93.08
5,825,865 * 10/1998 Oberlander et al. ................. 379/211

* cited by examiner

*Primary Examiner*—Tālivaldis I. Šmits
(74) *Attorney, Agent, or Firm*—McGuireWoods LLP; Louis J. Percello, Esq.

(57) ABSTRACT

A method and apparatus is disclosed for automatic segregation of signals of different origin, using models that statistically characterize a wave signal, more particularly including feature vectors consisting of a plurality of parameters extracted from a data stream of a known type for use in identifying data types by comparison, which can be Hidden Markov Model based methods, thereby enabling automatic data type identification and routing of received data streams to the appropriate destination device, thereby further enabling a user to transmit different data types over the same communication channel without changing communication settings.

27 Claims, 8 Drawing Sheets

METHOD AND APPARATUS FOR AUTOMATIC SEGREGATION AND ROUTING OF SIGNALS OF DIFFERENT ORIGINS BY USING PROTOTYPES

DESCRIPTION

BACKGROUND OF THE INVENTION

1. Field of the Invention

The present invention generally relates to receiving data of different origins (voice, text, images, etc.) via communication channels. More specifically, the invention relates to using Hidden Markov Model (HMM) based methods to segregate data of different origins that were sent over a communication channel after reaching a user computer at a receiving end.

2. Background Description

In modern communication it is necessary to segregate voice input from fax, TTY and other non-voice data in order to either activate relevant devices (ASR, fax machine, TTY, phone mail etc.) or to activate relevant application programs in a user computer (e.g. display texts, pictures, etc.). For some kinds of data (e.g. fax and telephone voice data) segregation is done in a specially designed modem that uses a special protocol to establish where to transmit data (e.g. to fax or to a telephone).

When data reaches a destination end of a communication channel and enters a computer via a modem it passes through several Open Systems Interconnection (OSI) levels until it reaches an application level where it is used by an application program (e.g. data transfer, e-mail, user authentication etc.) (See reference: Andrew S. Tanenbaum "Computer networks", 1988, Prentice Hall. N.J.). This data can be processed by an application program if the data is compatible with the application program's format.

An important example of processing multiple kinds of data are car embedded systems that may provide the following data trafficking: process data from satellites about a car location, process cellular telephone calls, accept credit cards by using cellular radio-based communication to verify credit transactions (in taxi cabs), send data to a car radio, process multimedia web data from Internet providers (to a portable car computer display), etc.

PROBLEMS WITH THE PRIOR ART

There are a number of problems with delivering data to a destination device. Some data may have protocols that are not compatible with protocols that are used by some OSI layer (e.g. by a modem at a physical layer or by an application level protocol) at a receiving end and therefore it cannot be delivered to a specified device automatically. For example, old fashioned TDD devices rely upon a person answering a phone to manually place a telephone pad on a TDD device when high pitched tones are heard (for a definition of TDD see L. Bahl, S. V. Degennaro, P. V. de Souza, D. Kanevsky and D. Nahamoo, "Communication aid for the hearing impaired based on automatic speech recognition", IBM Technical Disclosure Bulletin, Y0888-0827, Vol. 32, No, 7 December 1989, ASR).

Currently, some organizations are attempting to develop standard protocols for data trafficking (for example, EIA TR30.1 and CCITT SGXVII WP1 are attempting to develop a standard for the modulation means of the asymmetrical modem). But individual data communication equipment (e.g. modem) manufacturers want to create a de facto standard for their own products and this prevents introduction of a single standard. Another reason that prevents introduction of a single standard is the fast growing number of different kinds of transmitted data and devices that process this data. For example, some biometrics data, that is extracted and transmitted to biometrics servers for user authentication, does not fall easily into earlier classification categories of textual or voice data. (See reference on standard issues in John A. C. Bingham, *The Theory and Practice of Modem Design*, John Wiley & Sons, New York, 1988).

Opportunities for automation in selection of applications to activate (e.g. display a picture, play an audio card, or to display a text) are similarly lost if an application layer is not familiar with data formats (or data delivering protocols), or a user wishes to send non-voice data without changing the type of communication, as is now the practice in a typical communication setting. Another example is mobile IP systems such as a networked car. The server must be redialed every time a different type of data must be transmitted. Alternatively more than one phone communication must be active in order to simultaneously have a user able to speak with a car assistance operator, enable the operator to read about the car, enable the user as well as the operator to know the exact position of the car, etc.

It would be convenient if there were only one phone communication and the different functions could be activated sequentially.

SUMMARY OF THE INVENTION

It is therefore an object of the present invention to provide an improved system and method for segregation of different type of data at a receiving end in a communication channel.

A further object of the invention is a system and method that provides hierarchical segregation of different types of data along a communication path at a receiving end of a communication channel, in order to send different kinds of data to different destination devices.

Another object of the invention is an improved system and method that uses hidden Markov models that are trained on different kinds of input data to provide segregation of this data at a receiving end in a communication channel.

It is also an object of invention to have a system that detects changes in a type of input data and matches segments of data of different types with stored data prototypes to define the nature of data.

Still another object of the invention is a system that detects changes in type of input data using likelihood ratio and matching segments of data of different types with HMM based stored prototypes, in order to define the nature of data.

A further object of this invention is an improved system and method that uses linear hidden Markov models that are trained on different kinds of input data (voice, textual, pictorial, animated data) to provide segregation of this data at a receiving end (computer, CPU, embedded system in a car), in a communication channel (over a telephone, over a network, ISDN, dedicated lines, via radio, a satellite communication system).

In accordance with the invention, a Hidden Markov Model is used to train on different kinds of input. For example, a linear HMM consists of states that are connected with arcs and loops (arcs that connect states with themselves). Each arc and loop give rise to probability distributions that are modeled by a mixture of Gaussian distributions. This HMM can then train on the following data that is sent via different types of communication channels (telephone, digital, via radio, delicate lines etc.): 1) a wide variety of telephone speech, 2) TTY signals, 3) Baudot signals, 4) fax signals, 5) pictorial data, and 6) animated data.

The length of the sequence of HMM imposes a minimum duration. The invention begins by finding the best path alignment at the beginning of a signal. Acoustic data can be represented as a string of frames, each frame corresponding to a vector that stores some acoustic information for some moment of time. This acoustic data segment (a string of frames) approximately corresponds (in duration) to HMM set of states. There is a standard procedure that permits alignment of the HMM set to a string of frames. Different HMMs would produce different alignments to this acoustic string. The HMM best matched to the acoustic string would give the highest alignment score. Therefore, defining the best aligned HMM allows definition of the most probable acoustic source. This will automatically determine the nature of the signal. Then a module that recognizes data by type is located before a block that sends data to different devices that are connected to a receiving communication end or to different application programs inside a particular device.

After the data type is defined it can be either sent to a designated device (e.g. fax machine, telephone, TDD, PC, prints etc.) or to a relevant application program (e.g. editor for textual data, Automatic Speech Recognition module for speech, an image editor for images, music editor for music, etc.).

Data is segregated with different segregation modules that are connected hierarchically and perform different segregation tasks on different kinds of data. If data trafficking is supported by an OSI model this hierarchical segregation structure should be compatible with OSI layers. For example, a first segregation module that separate only two kinds of data—voice and non-voice—could be installed between physical and data link layers. This module could consist of a chip with embedded HMM algorithms for separating two kinds of data.

Each kind of data could be sent via different paths through OSI layers and processed by different segregation modules that require more CPU power and have the capability to segregate more complex kinds of data. For example, if non-voice data is separated by a first module at a lower OSI layer, a second segregation module at entry to an application layer can distinguish textual data from pictorial data and send these data to corresponding textual or pictorial editors.

An important example of application of the present invention is for segregation of data in embedded technology, such as a car system that is processing different kinds of signals for maps, radio, telephones, portable car faxing machines, portable computers, and the like. This segregation system could have hierarchical structure. The first level would define the kind of devices to which data is to be directed—telephone, radio, map display or PC.

Then other segregation levels located, for example, in a PC would segregate data for different applications. Such a segregation module could allow a user to send non-voice data without changing the type communication. While talking over a telephone that is hooked to a computer display, the user could display some pictures and send them without interfering with the phone connection. For example, the user could say " . . . and now I am sending a family picture" and drag a picture on a display to an icon that is linked to an application that sends data, using the same link already established for the phone connection, outside (to the same destination point where voice data from a telephone is sent).

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a block diagram of a modem with the functionality of the segregation data module built-in.

DETAILED DESCRIPTION OF A PREFERRED EMBODIMENT OF THE INVENTION

Figure 1:
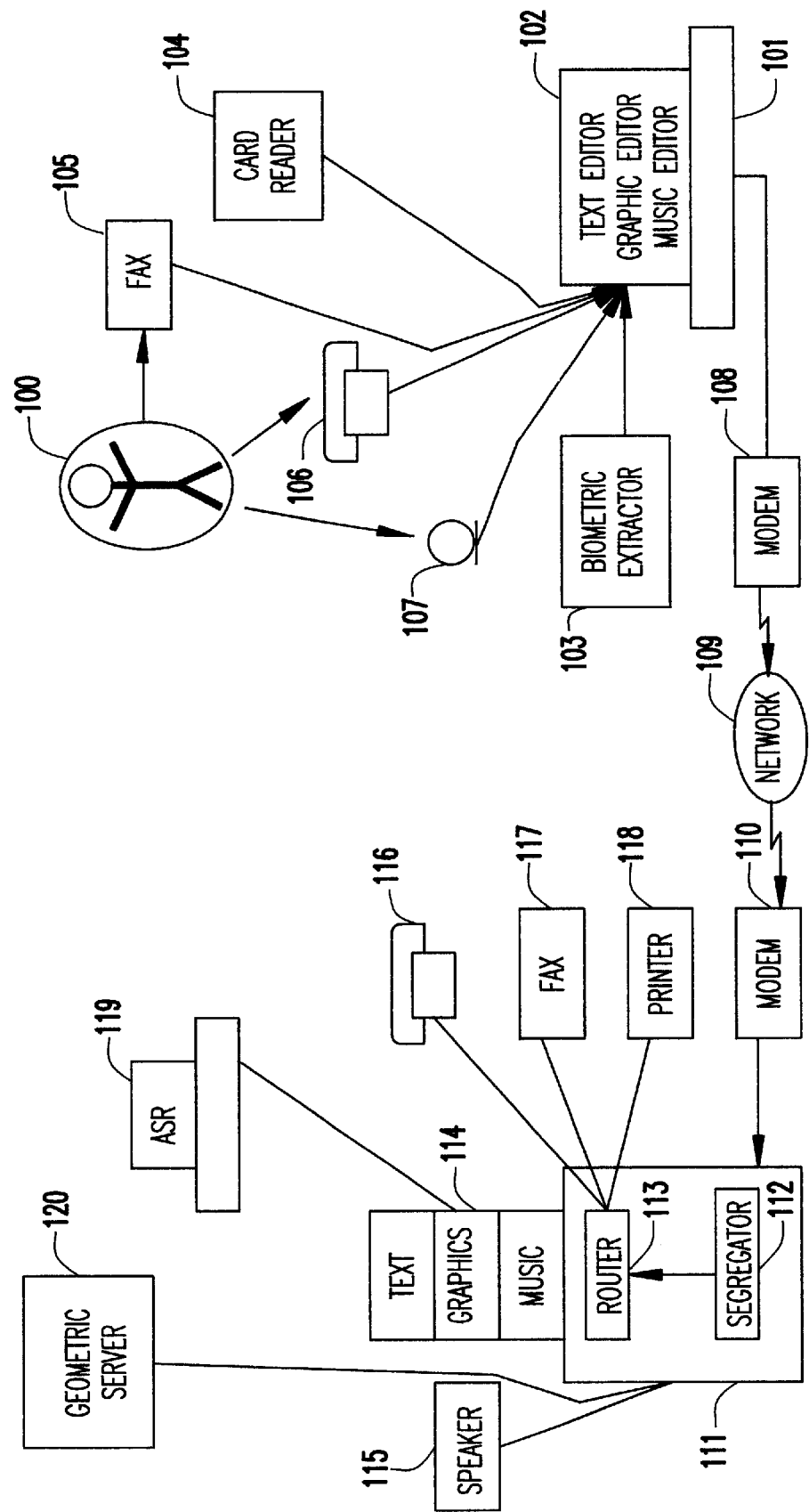
FIG. 1 is a block diagram showing some preferred variations of data segregation for communication between PCs.

Referring now to the drawings, and more particularly to FIG. 1, there is shown a user 100 who operates the various devices in this figure (telephone, facsimile machine etc.). The user 100 can send various data applications (voice, textual, etc.) in a single session without changing data type communication settings. This is done as follows. A computer system 101 is connected with a computer system 111 via a network 109. A modem 108 connects several devices at a sender end to a network 109. these devices are: a computer system 101, a facsimile machine 105, a telephone 106, a mike 107, a biometric reader 103, and a card reader 104. Some other examples of communication devices that could send data over the network and that are not shown on FIG. 1 are the following: a pager, a laptop, a calculator, a TV, a video camera, radio, and an audio player.

These communication devices send various types of data via network 109 to a modem 110 at a receiving end. Different kinds of data can come from different software applications such as a text editor, a graphics editor, or a music editor in a computer system (102). Modem 110 connects network 109 to the computer system 111 and communication devices such as a telephone 116, a facsimile machine 117, a speaker 115, a biometrics server 120, an Automatic Speech Recognition module 119, and a printer 118. Data flow from the network 109 is segregated via modem 110 and segregation module 112. A modem usually can segregate fax and telephone data via embedded protocol systems. But other types of data may require a more complex segregation system 112.

After data is segregated it is distributed to corresponding communication devices and software applications (textual, graphics, music—114). In particular, readings from a biometrics extractor 103 should go to the biometrics server 120 that stores user biometrics.

Figure 2:
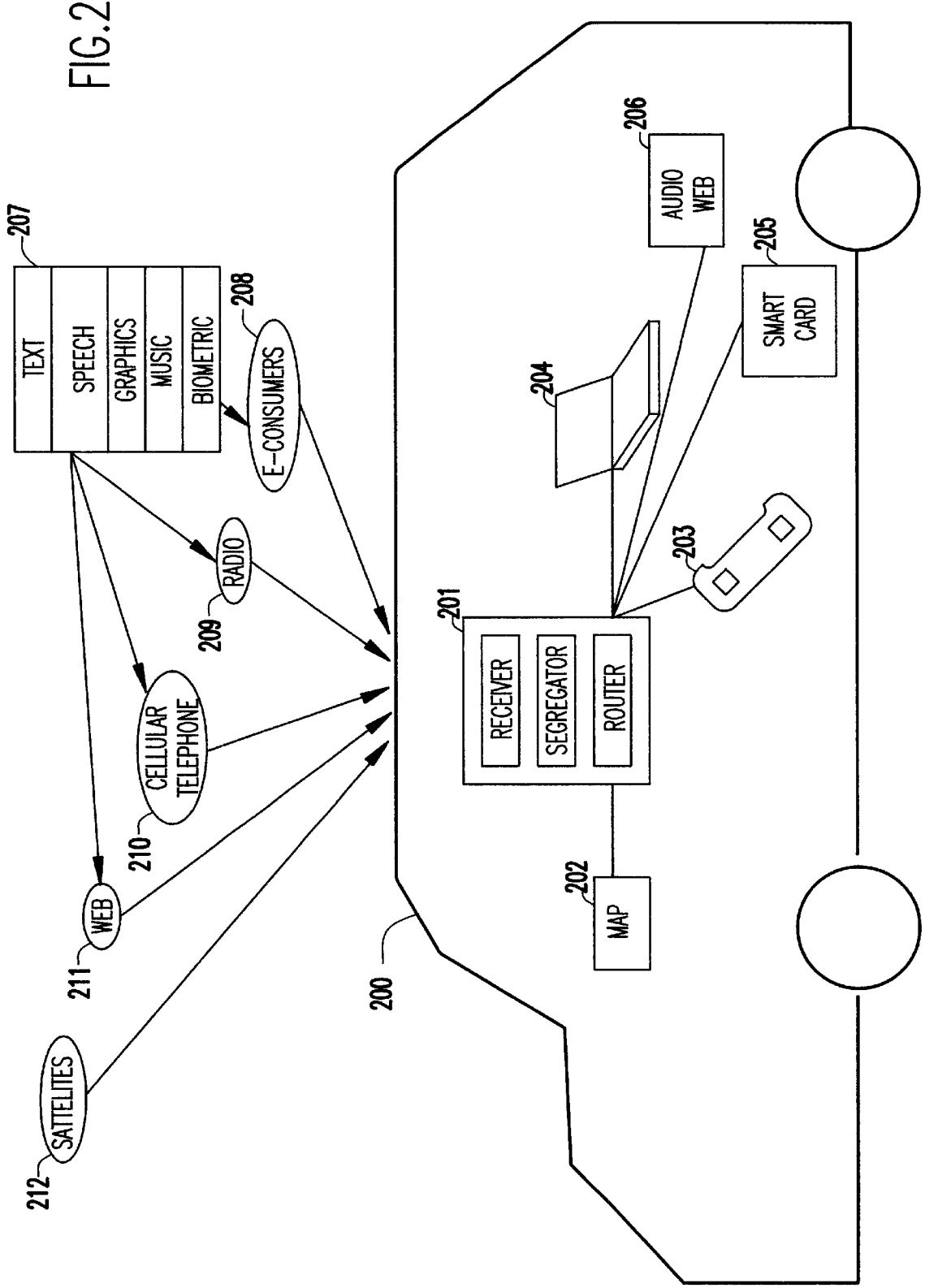
FIG. 2 is a block diagram showing data segregation in a car system.

Turning now to FIG. 2, there is shown a variant of a communication system for a car (200). It includes a computer (embedded) system 201 that contains a receiver (e.g. a cellular modem) and also a segregator and router (as in FIG. 1). Communications devices that are shown connected to the router are a car cellular telephone 203, a smart card reader 205 (for taxi cabs), a map display 202 (that displays maps for a driver), a laptop 204, an audio-web player 206 (that describes—via audio—the content of web pages for a driver). Many other communication devices could be included in a car but are not shown in FIG. 2: a radio, an audio player etc. A communication medium for interaction with a car system can include satellites 212, cellular carriers 210, radio stations 209, e-commerce 208, and web sites 211, etc. All these communication facilities send and process media 207 that may include textual data, speech, graphics, music and biometrics.

Figure 3:
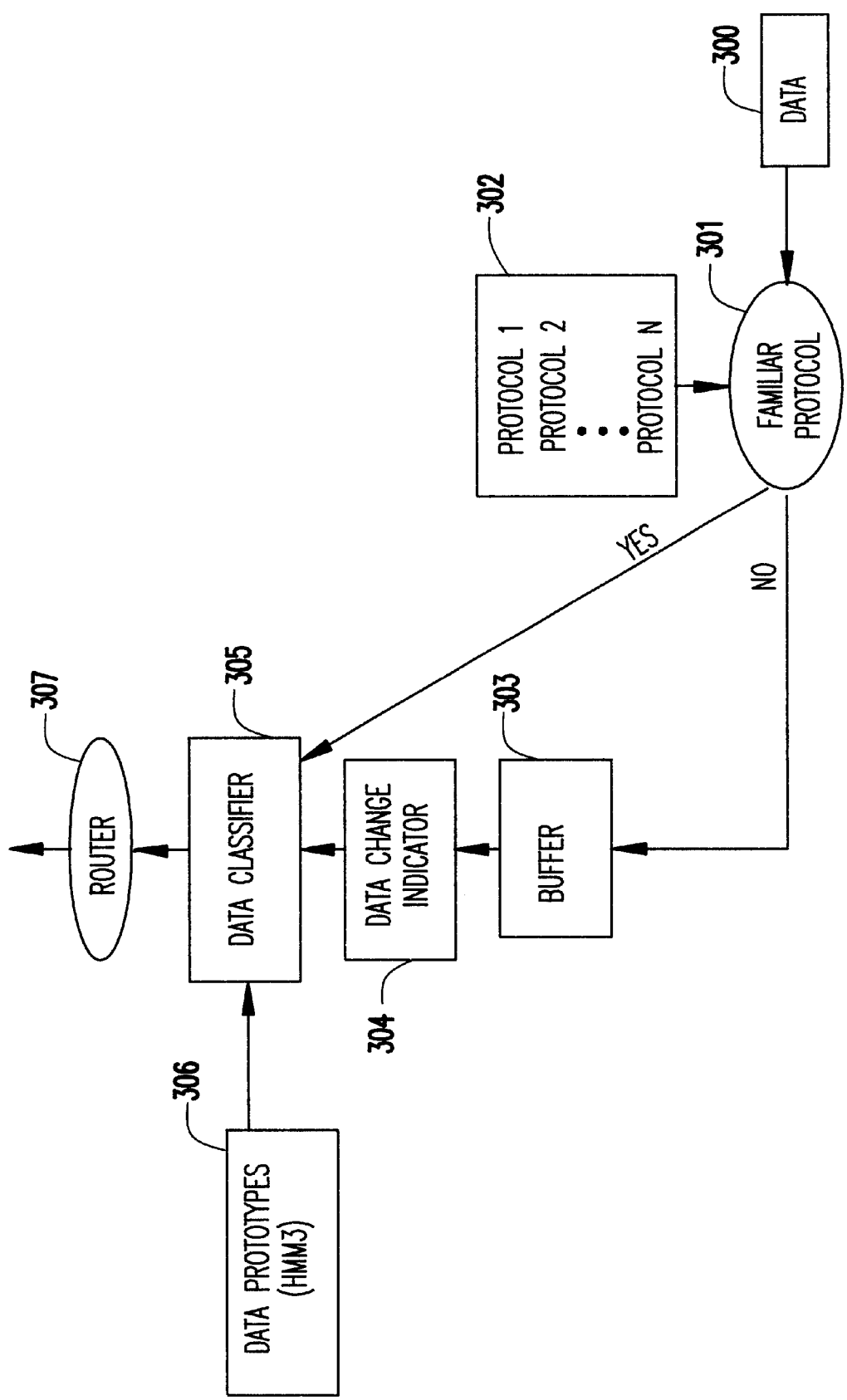
FIG. 3 is a flow chart of a process performed by the segregation module to provide trafficking of data of different kinds.

To examine in greater detail the segregation module shown in FIG. 1, turn now to FIG. 3. Data 300 is processed by a module 301 that is trying to identify data origin via a match with a stored set of protocols 302. For example, T30 is a logical protocol that facsimile machines use to establish a data link. There are other protocols that are similarly familiar. If there is a match in protocol features the data is sent to a classifier module 305 where it is classified accordingly and then sent to a router 307 for delivery to a corresponding communication device as described in FIGS. 1 or 2. Otherwise, if there is no match with a familiar protocol the data is sent to a buffer 303. Data in the buffer is processed by a data change indicator 304 that tries to determine which portions of the data flow belong to the same origin. Data thus determined to have the same origin is sent to classifier 305. Classifier 305 uses data prototype module 306, which contains a stock of data prototypes, to find out what data prototype has the best match with the data in classifier block 305. Data prototypes in module 306 are models that statistically characterize a wave signal, more particularly including feature vectors consisting of a plurality of parameters extracted from a data stream of a known type for use in identifying data types by comparison, and can be HMM based, as described in detail below. After establishing a data type, data portions are sent to router 307 for further delivery.

Data change indicator 304 exploits a process for indicating a change in data type that consists of tile following steps:

- a data type of first portions of data are associated with some data type prototypes; this is done by aligning data portions to HMM base prototypes and defining what prototype (HMM) has the best match to data portions, represented as a likelihood of producing this data portion given the HMM;
- a likelihood of a new data portion given a previous data portion with assumption that it belongs to the data type of the previous data portion is computed;
- if the likelihood is below a precomputed threshold a change in the data type between previous and current data portions are indicated;
- if the likelihood is above of the precomputed. threshold then the current data portion is associated with the data type of the previous data portions and the process is continued with new data.

Figure 4:
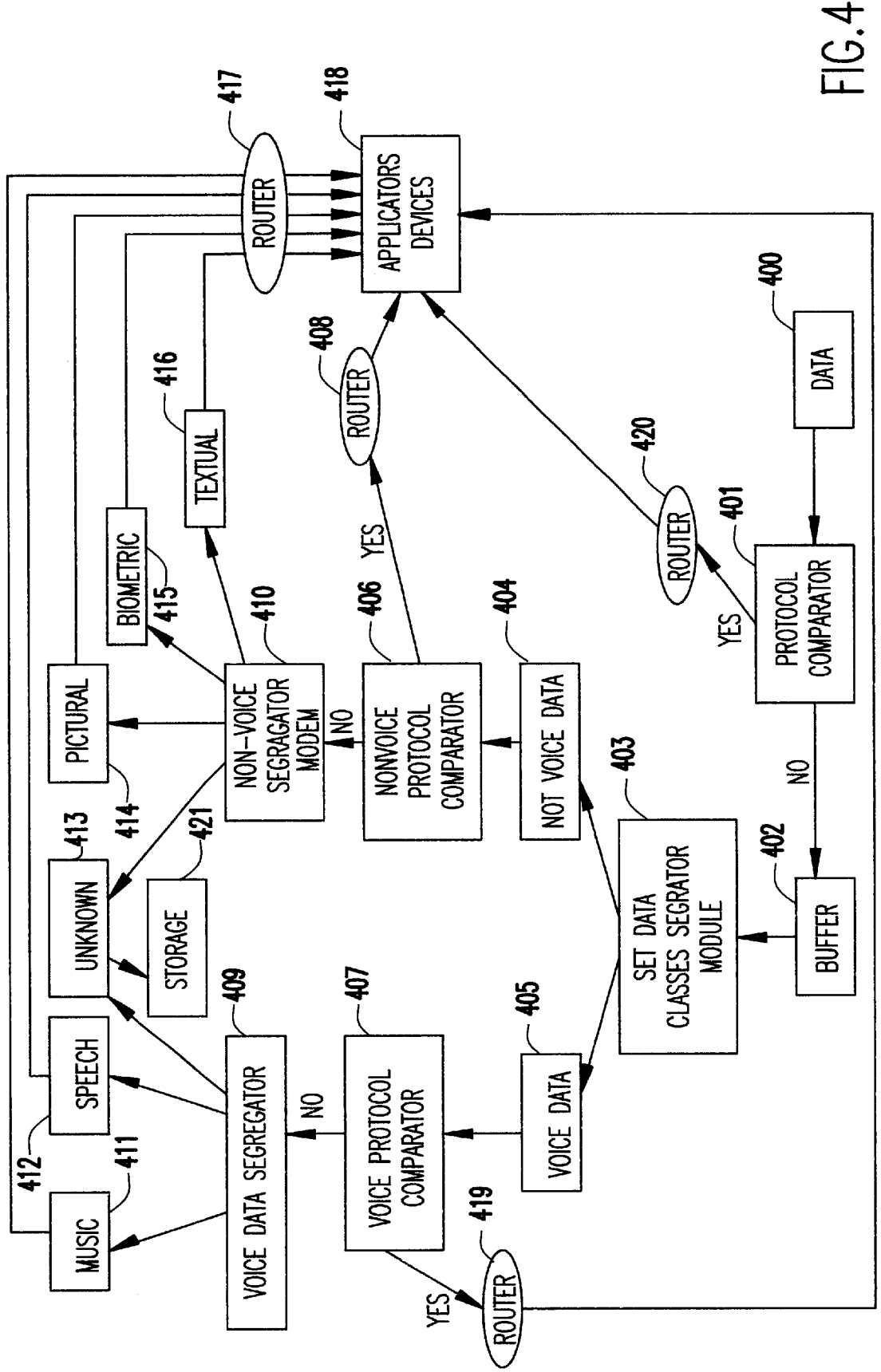
FIG. 4 is a flow chart of a process performed by the hierarchical segregation module.

Turning now to FIG. 4, there is shown in greater detail the hierarchical approach to data segregation that was described in FIG. 3. In this approach, initial classes of data types are established (such as voice data, as compared to non-voice data) and then refinement for each data class are made with further processes.

Data 400 enters a protocol comparator module 401 that attempts to establish a data type using a protocol similar to what was described in FIG. 3, block 301. If a familiar protocol is found the data is sent to a router 420 and then to applications or devices 418 (as described in FIGS. 1 and 2). If the origin of the data 400 is not established using protocol comparator 401, the data is sent to buffer 402 and then to a first data classes segregation module 403. This module 403 checks whether the data is of voice 405 or non-voice 404 type and sends the data to corresponding protocol comparators (402 for voice and 406 for non-voice). These protocol comparators are similar to protocol comparator 401, and seek to establish data origins using another set of protocols in a class of voice data and in non-voice data, respectively. If data origins are established using voice or non-voice based data protocols, the data are sent via routers 419 or 408 to applications or communication devices 418. Otherwise the process at comparators 402 and 406 is continued by sending voice data from comparator 402 to segregation module 409 and by sending non-voice data from comparator 406 to segregation module 410. Voice data segregation module 409 can make further distinction in data types—speech 412 or music 411. Similarly, segregation module 410 can classify data as pictorial 414, textual 416, or biometrics 415. Data with known types are sent to router 417 for delivery to corresponding applications or devices 418. If a data type is not established by segregation modules 409 or 410, the data is set aside as unknown 413, and is then sent to storage 421.

Figure 5:
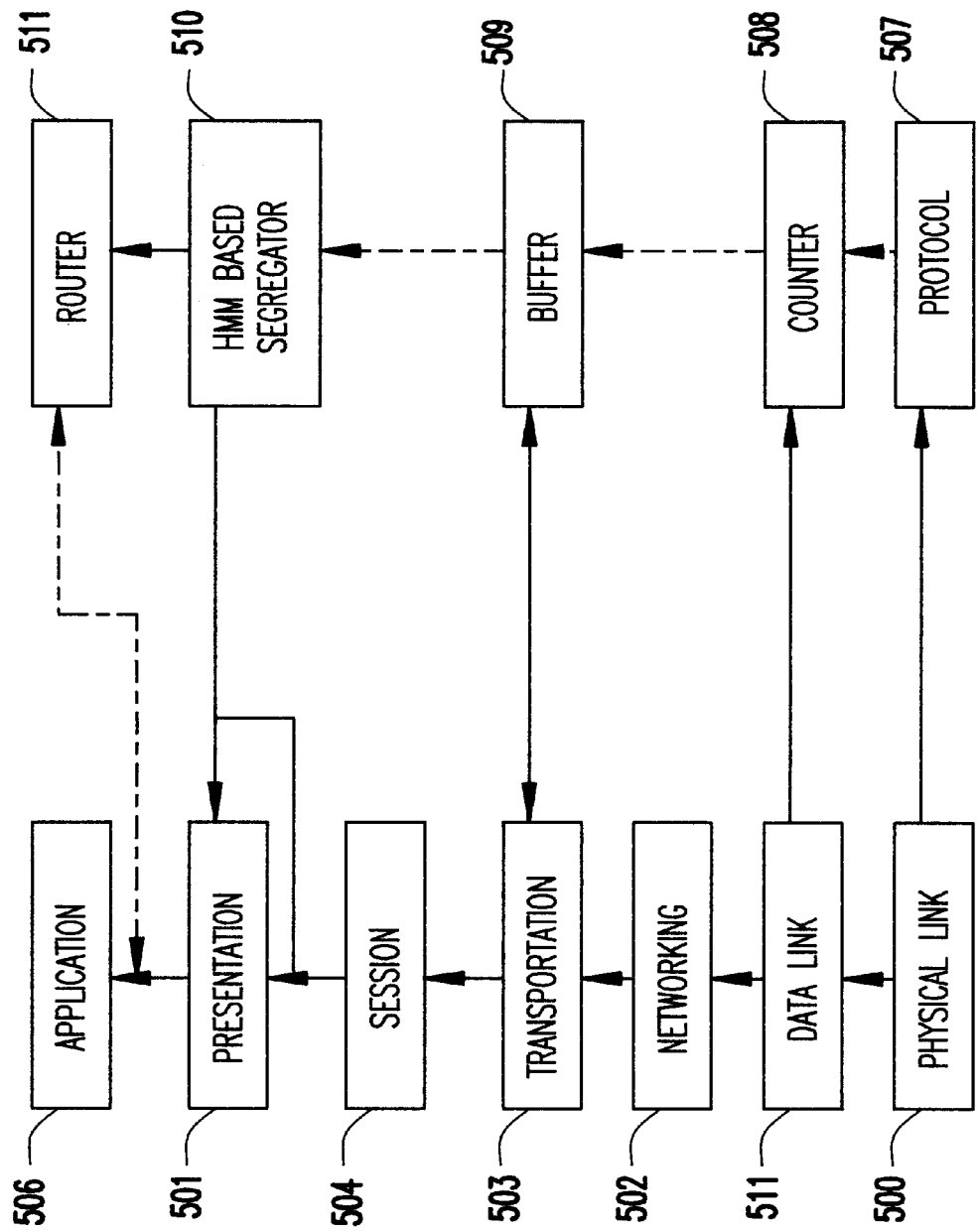
FIG. 5 is a block diagram that relates the data segregation module to an OSI architecture.

There exist different types of networks that may require different communication protocols. Networks that offer support for communication between many types of system without protocol conversions are "open" because they allow open access to many other facilities. A system connected to such a network is called an open system. As the need for greater interworking between many machines of different manufacture became apparent, a program of protocol standardization got underway. This led to creation of the Open Systems Interconnection (OSI) architecture. FIG. 5 describes how the segregation module features in accordance with the invention can fit OSI architecture.

The OSI involves seven layers—physical link 500, data link 501, networking 502, transport 503, session 504, presentation 505, and application 506. The description of these layers functions can be found in Gill Waters, *Computer communication networks*, 1991, McGraw-Hill Book Company, England. For our purposes we also explain how OSI architecture is related to some data segregation features that were described in previous figures. The data segregation is preceded with a protocol 507 (corresponds to protocol comparator 401 in FIG. 4) that can be located in physical communication devices (like modems) and therefore it is linked to physical link layer 500 in FIG. 5. A counter module 508 operates with a flow of bits and represent a stream of bits as ones and zeros (that are processed later by mathematical operators in a HMM segregator module). Counters are standard data link objects needed to process bits. The invention combines into one (e.g. embedded in one modem chip) a counter with a segregation module in such a manner which specifies the statistical characteristics of the bit flow so as to define the data source. This module can be located in the data link layer 501 that processes bit streams from data communication link. A buffer 509 in the segregation module should be located in transport layer 504 since the transportation block provides flow control and contains buffer where bits from communication links are accumulated. Presentation layer 505 defines some data types (like ASCII) and therefore an HMM based segregator 501 that defines data types should be located in the presentation layer 505. Application layer 506 involves application programs and destination communication devices, and therefore a router 511 in a segregation module should be placed before the application layer 506.

Figure 6:
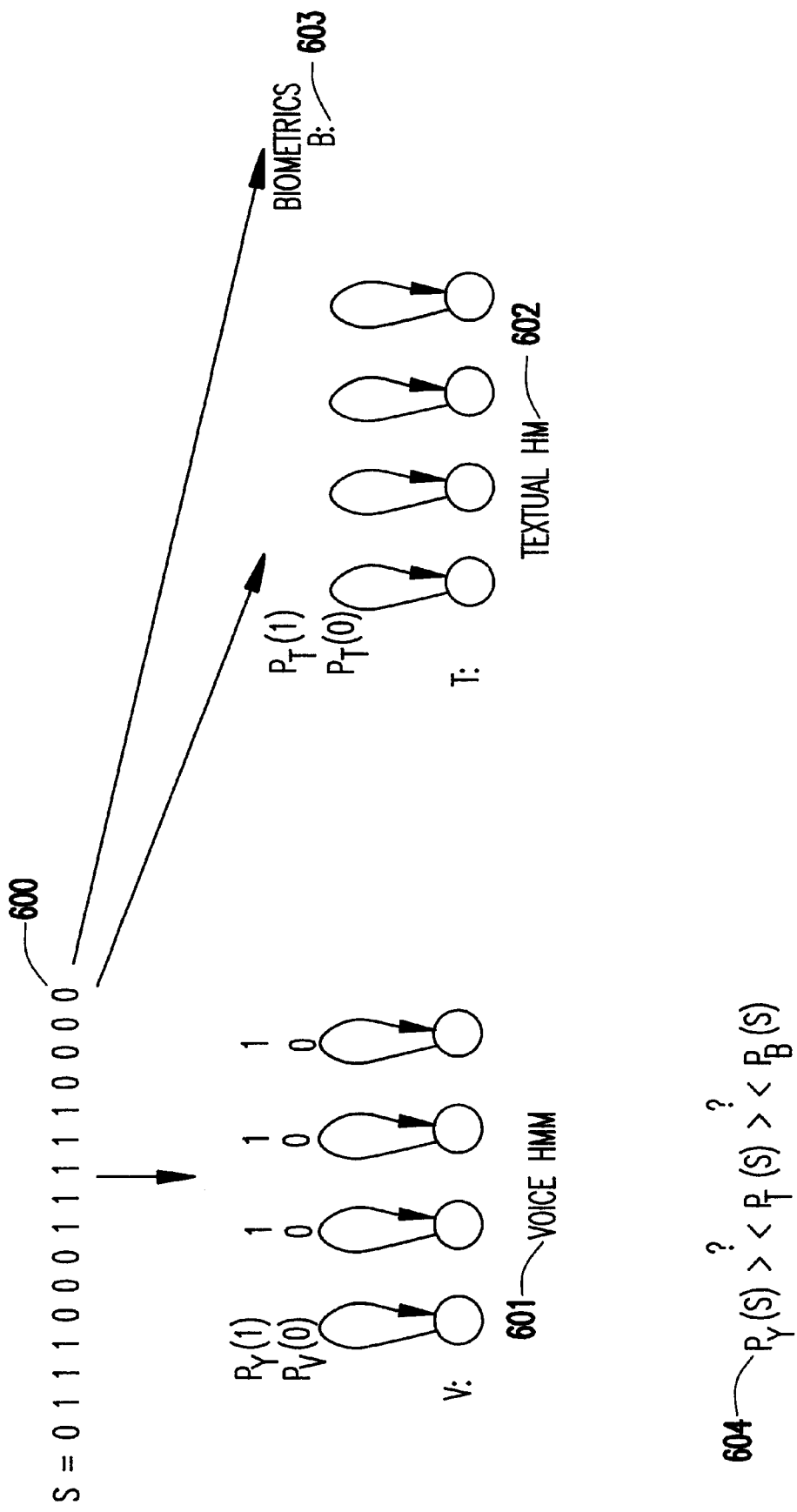
FIG. 6 is a flow chart of a process of using HMM in the segregation data module.

Turning now to FIG. 6, there is shown standard HMM features in the context of data segregation. An input string S 600 of bits is represented as "1"s and "0"s. Voice HMM 601 and textual HMM 602 are represented as a linear set of self loops connected with transition arcs. Biometric HMM 603 is similarly represented. Output labels of the arcs are "0"s and "1"s. In FIG. 6, three types of data is considered: voice 601, textual 602 and biometrics 603. Input string S and the HMMs give rise likelihood scores 604 as described in standard text books for HMM (see for example, Rabiner L. R. (1989), *A tutorial on hidden Markov models and selected applications in speech recognition,* Proc. IEEE 77(2): 257–286). The largest likelihood score points to the best matched data origin HMM prototype.

Figure 7:
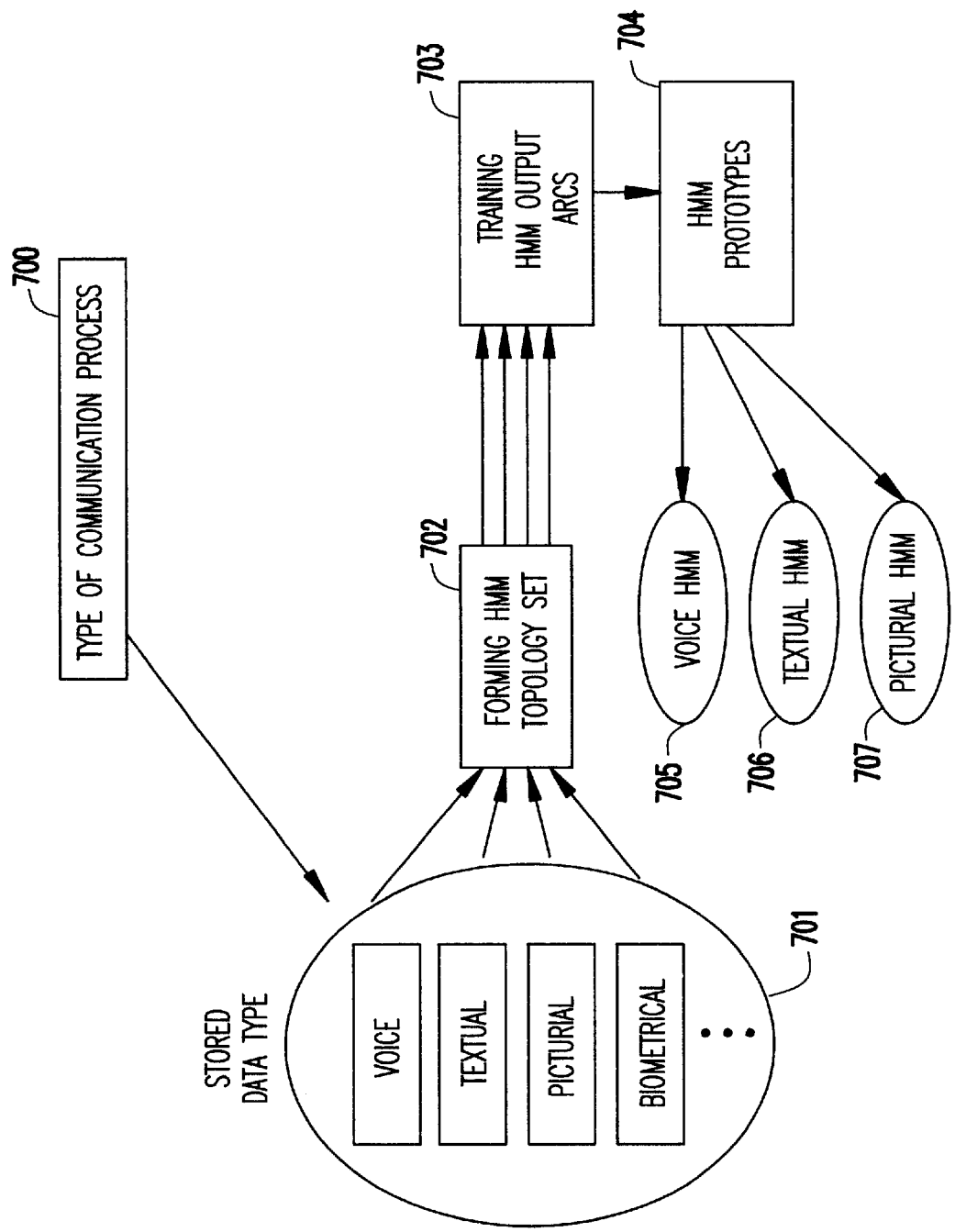
FIG. 7 is a flow chart of a process of generating and training HMM based prototypes.

FIG. 7 describes a procedure for generating HMMs for data origin classifications. In general, this description follows standard HMM textbook technology in speech recognition. The main difference is that data are divided into types by their origins (voice, textual, pictorial, biometrics—701) and a type of communication process 700 (e.g. over telephone, via radio, digital line, etc.). Generation of HMM prototypes 704 require two steps: i) choosing HMM set topology 702 (linear in our example) and ii) training output and transition arcs 703. As a result of training, a set of HMMs is produced corresponding uniquely to each data type (voice HMM 705; textual HMM 706; and pictorial HMM 707).

Figure 8:
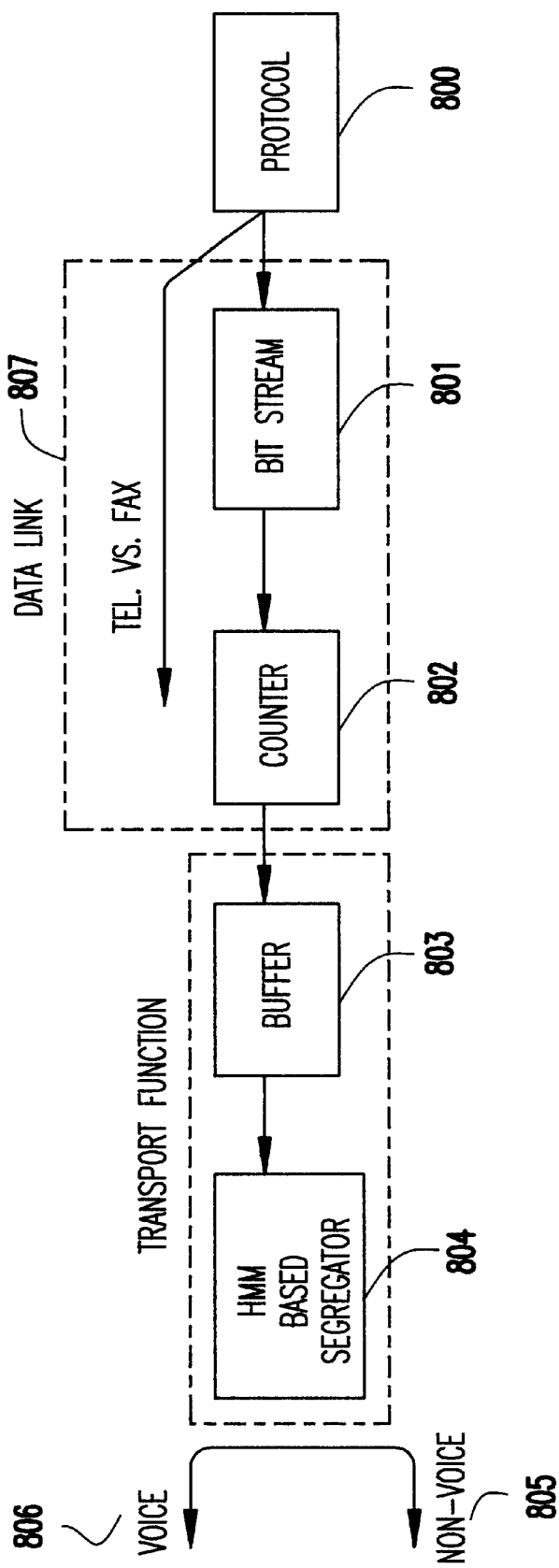

Modem manufacturers tend to produce modems with additional functions from OSI layers, such as buffering, compressing etc. It is natural to expect that modem manufacturers will continue to produce modems for emerging applications. FIG. 8 describes how additional segregator functions could be implemented in a modem in a printed circuit card assembly. In this respect, FIG. 8 closely follows the representation of segregator functions in the context of OSI architecture and known mapping of modem functionality into OSI layers (see John A. C. Bingham, *The theory and practice Of modem design,* 1988, John Wiley & Sons, New York). Protocol module 800 provides modem protocol functions (for example, distinguishing fax from telephone). In data link layer 807 a bit stream is processed by counter 802 (corresponding a counter 508 in FIG. 5). Bits are accumulated in a buffer 803 and are processed by HMM based segregation module 804. This allows segregation of voice (805) and non-voice (806) data. Note that the linkage of segregation functions to OSI architecture in this modem context is slightly different from the linkage in FIG. 5. In FIG. 8 segregation functions are related to a transport layer (rather then to a presentation layer as in FIG. 5).

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. An apparatus for segregation of signals of different origin, comprising:
    one or more computer systems at a receiving end, each having a central processing unit (CPU) and a memory, and each being connected to a network;
    one or more communication devices that send or receive a plurality of data via said network, said data being of a plurality of origins and combined into a common data stream at said receiving end;
    means, executed by said CPU at a receiving end, for processing allowable data types residing on said one or more computer systems, and for creating one or more data models;
    means, executed by said CPU, using said data models for parsing said data stream into its component segments, each said segment having one of said plurality of origins, and for determining a destination device for each said segment, and for sending each said segment to its corresponding destination device.

2. The apparatus of claim 1, wherein said destination devices can be any one or more of the following: telephone, fax machine, printer, card reader, biometrics reader, pager, PC, laptop, calculator, speaker, mike, TV, video camera, radio, audio player, different devices that process audio, different devices that process texts, or different devices that process graphics.

3. The apparatus of claim 2, wherein said receiving end is located in a car and wherein said destination devices can additionally include one or more of the following: map reader, audio web player, or car radar system.

4. The apparatus of claim 1, wherein said plurality of data origins can be any one or more of the following: voice data, non-voice data, speech, music, textual data, or graphics.

5. The apparatus of claim 1, wherein said means for parsing and determining further comprise:
    means for identifying one or more of said segments by comparing said data stream with a set of known protocols stored at said receiving end;
    if a segment is identified with a known protocol, means for further identifying said segment with its corresponding origin and routing said segment to its corresponding destination device;
    if a portion of said data stream is not identified, means for sending said portion to a buffer;
    means for processing the contents of said buffer to identify remaining segments with their corresponding origins and routing said segments to corresponding destination devices.

6. The apparatus of claim 5, wherein said processing means further comprises:
    means for indicating a change in data type, said indicating means thereupon identifying a data segment having an origin;
    means for matching said data segment to stored prototypes of data types;
    if said matching identifies an origin of said data segment, means for routing said data segment to one or more destination devices corresponding to said origin;
    if said matching does not identify an origin of said data segment, means for either discarding or storing said data segment.

7. The apparatus of claim 6, wherein said stored prototypes of data types are HMM, and wherein said matching of said data segment further comprises:
    means for computing the best HMM path for said data segment for each HMM prototype;
    means for comparing likelihood scores of best paths for all HMM prototypes; and
    means for labeling said data segment with a data type that corresponds to the HMM having the highest likelihood score.

8. The apparatus of claim 6, wherein elements of said apparatus are related to OSI layers as follows:
    said means for identifying data segments with known protocols are located in a physical link layer;

said data stream is represented as bit strings of "1"s and "0"s in a data link layer, said buffer for storage of these bit strings being located in a transport layer;

said means for segregating data types are located in a presentation layer;

said means for routing data segments to destination devices are located in an application layer.

9. The apparatus of claim 8, wherein said HMM based segregation system, said buffer, and a counter are embedded in a modem on a printed circuit card.

10. The apparatus of claim 6, wherein said indicating means further comprise:

means for associating a data type of first portions of said data stream with some of said data type prototypes;

means for computing a likelihood that a next data portion belongs to the data type of said first data portion;

wherein a change of data type between said first and said next data portions is indicated if the likelihood is below a precomputed threshold; and wherein if said likelihood is above said precomputed threshold then said next data portion is associated with the data type of said first data portion, and the process is repeated with new data portions (until either data change is indicated or there are no new data portions).

11. The apparatus of claim 5, wherein said processing means further comprises:

means for classifying said buffer contents into a plurality of classes of data types, said classes being arranged in a hierarchy composed of a plurality of nodes and levels, the last level being said data types;

means for routing said buffer contents for processing at successive levels of said hierarchy, classification for any said level being done at a prior level;

means for segregating data types, said means being applied at a plurality of nodes in said hierarchy at the next level before said last level.

12. The apparatus of claim 11, wherein each said segregating means is further comprised of:

means for indicating a change in data type, said indicating means thereupon identifying a data segment having an origin;

means for matching said data segment to stored prototypes of data types;

if said matching identifies an origin of said data segment, means for routing said data segment to one or more destination devices corresponding to said origin;

if said matching does not identify an origin of said data segment, means for either discarding or storing said data segment.

13. The apparatus of claim 12, wherein said stored prototypes of data types are HMM, and wherein said matching of said data segment further comprises:

means for computing the best HMM path for said data segment for each HMM prototype;

means for comparing likelihood scores of best paths for all HMM prototypes; and means for labeling said data segment with a data type that corresponds to the HMM having the highest likelihood score.

14. The apparatus of claim 13, wherein said HMM has the following features:

arc output labels are "0"s and "1"s;

each HMM is a concatenation of the same self loop and transition loop and models the arcs with a mixture of Gaussian distribution.

15. The apparatus of claim 14, wherein each HMM accepts as input a string of bits ("0"s and "1"s).

16. The apparatus of claim 13, wherein said prototypes correspond to the following data types: voice, non-voice, speech, music, biometrics, textual, graphics, animated, telephone speech, and fax.

17. The apparatus of claim 11, wherein said hierarchy is of two levels, there being two classes of data types: voice data and non-voice data.

18. The apparatus of claim 17, wherein voice data is segregated into data types including: speech, music, telephone speech, and CD-ROM quality speech.

19. The apparatus of claim 17, wherein non-voice data is segregated into data types including: textual, graphics, and fax.

20. The apparatus of claim 5, wherein said further identification is accomplished by a data classifier, which labels the identified segment with its corresponding origin and sends said segment to a router for routing to said segments corresponding destination device.

21. The apparatus of claim 1, wherein a user of the apparatus can send several different data types to said network in a single session without changing data type communication settings.

22. The apparatus of claim 1, wherein said means for processing and creating further comprise:

means for sampling allowable data types; and means for building a data model using said sampling.

23. The apparatus of claim 22, wherein said building means uses Hidden Markov Models.

24. An apparatus for segregation of signals of different origin, comprising:

one or more computer systems at a receiving end, each having a central processing unit (CPU) and a memory, and each being connected to a network;

one or more communication devices that send or receive a plurality of data via said network, said data being of a plurality of origins and combined into a common data stream at said receiving end;

means, executed by said CPU, for evaluating portions of said data stream in sequence, and for generating data prototypes for each type of data processed at said receiving end;

means for storing said data prototypes in said memory.

25. The apparatus of claim 24, wherein data types for which said prototypes are created are the following: voice, non-voice, textual, pictorial, biometrics, and graphics.

26. The apparatus of claim 25, where said data type prototypes are associated with data type HMM models.

27. The apparatus of claim 25, wherein said means for generating HMM prototypes further comprise:

means for forming an HMM topology;

means for training HMM output and transition arcs.

* * * * *